United States Patent
Palmer

(10) Patent No.: US 10,151,932 B1
(45) Date of Patent: Dec. 11, 2018

(54) STEREOSCOPIC THREE DIMENSIONAL PROJECTION SYSTEM USING ELLIPTICAL POLARIZATION

(71) Applicant: Volfoni R&D, Villeneuve-Loubet (FR)

(72) Inventor: Stephen Palmer, Gateshead (GB)

(73) Assignee: Volfoni R&D, Villeneuve-Loubet (FR)

( * ) Notice: Subject to any disclaimer, the term of this patent is extended or adjusted under 35 U.S.C. 154(b) by 3 days.

(21) Appl. No.: 15/795,878

(22) Filed: Oct. 27, 2017

Related U.S. Application Data

(60) Provisional application No. 62/553,518, filed on Sep. 1, 2017.

(51) Int. Cl.
| | |
|---|---|
| *G02B 27/26* | (2006.01) |
| *G03B 35/16* | (2006.01) |
| *G02B 27/22* | (2018.01) |
| *G02F 1/1347* | (2006.01) |
| *G03B 21/28* | (2006.01) |
| *G02F 1/139* | (2006.01) |
| *G02B 27/14* | (2006.01) |

(52) U.S. Cl.
CPC .......... *G02B 27/26* (2013.01); *G02B 27/144* (2013.01); *G02B 27/2264* (2013.01); *G02F 1/1395* (2013.01); *G02F 1/13471* (2013.01); *G03B 21/28* (2013.01); *G03B 35/16* (2013.01)

(58) Field of Classification Search
CPC ...... G02B 27/26; G02B 27/28; G02B 27/283; G02B 27/286; G02F 1/1395; G02F 1/13471
See application file for complete search history.

(56) References Cited

U.S. PATENT DOCUMENTS

| | | | |
|---|---|---|---|
| 7,528,906 B2 | 5/2009 | Robinson et al. | |
| 7,760,157 B2 | 7/2010 | Cowan et al. | |
| 7,857,455 B2 | 12/2010 | Cowan et al. | |
| 8,220,934 B2 | 7/2012 | Schuck | |
| 9,740,017 B2 | 8/2017 | Hoang et al. | |
| 2008/0143965 A1* | 6/2008 | Cowan | G02B 27/26 353/8 |
| 2008/0170294 A1* | 7/2008 | Kuroda | G02B 5/3016 359/487.05 |
| 2012/0147280 A1* | 6/2012 | Osterman | G02B 27/26 349/9 |

(Continued)

FOREIGN PATENT DOCUMENTS

JP 2009199070 A * 9/2009

*Primary Examiner* — Christina Riddle
*Assistant Examiner* — Christopher Lamb, II
(74) *Attorney, Agent, or Firm* — John W. Powell; Verrill Dana, LLP

(57) ABSTRACT

The present invention discloses a stereoscopic 3d projection system that is based on elliptical polarization, and more specifically a time-multiplexed stereoscopic 3d projection system that enables the viewer to observe stereoscopic 3d images on the surface of a polarization-preserving projection-screen via utilization of passive elliptically-polarized viewing-glasses. The disclosed invention provides a stereoscopic 3d projection system that is capable of operating at higher frame-rates and/or with higher optical light efficiency as compared to other prior-art technologies that are instead based on circular polarization.

14 Claims, 4 Drawing Sheets

(56) References Cited

U.S. PATENT DOCUMENTS

| | | | |
|---|---|---|---|
| 2012/0218634 A1* | 8/2012 | Kim | H04N 13/337 359/466 |
| 2013/0114136 A1* | 5/2013 | Saito | G02B 5/3016 359/465 |
| 2015/0103318 A1 | 4/2015 | Lee et al. | |

* cited by examiner

FIG. 1 (prior-art)

FIG. 2 (prior-art)

FIG. 3 (prior-art)

STEREOSCOPIC THREE DIMENSIONAL PROJECTION SYSTEM USING ELLIPTICAL POLARIZATION

CROSS-REFERENCE TO RELATED APPLICATION

This application claims the benefit of priority to U.S. Provisional Application No. 62/553,518, filed Sep. 1, 2017, which is incorporated herein by reference.

FIELD OF INVENTION

The present invention relates to a stereoscopic three dimensional (3d) projection system based on elliptical polarization, and more specifically to a stereoscopic 3d projection system for the viewing of time-multiplexed stereoscopic 3d images via utilization of passive, elliptically-polarized viewing-glasses. The disclosed invention enables the viewing of stereoscopic 3d images at higher frame-rates and/or with higher optical light efficiency as compared to other prior-art technologies that instead use circular polarization according to the state-of-the-art.

BACKGROUND OF THE INVENTION

Stereoscopic three dimensional (3d) projection systems have been used for many years. One technology known to the art and described, for example, in U.S. Pat. No. 7,528,906 B2 issued May 5, 2009 and entitled "Achromatic Polarization Switches", describes how a polarization modulator can be placed in-front of a single-lens projector, such as a 3-chip DLP digital cinema projector or otherwise.

The projector is arranged so as to generate a single image-beam comprising a rapid succession of alternate left and right-eye images at high speeds of typically 144 Hz (hertz). The polarization modulator then imparts an optical polarization state to images generated by said projector and said polarization modulator is typically operated in synchronization with said projector in order to arrange for all left-eye images to possess a first state of circular polarization and all right-eye images to possess a second state of circular polarization, with said first and second states of circular polarization being mutually orthogonal (i.e possessing opposite senses of rotation, for example with said first circular polarization state comprising clockwise or right-handed circular polarization and said second circular polarization state comprising anti-clockwise or left-handed circular polarization).

Thereafter, said left and right-eye images are focused onto the surface of a polarization-preserving projection-screen such as a silver-screen or otherwise, thereby enabling the viewing of time-multiplexed stereoscopic 3d images via utilization of passive circular-polarized viewing-glasses. It will be known to one skilled-in-the-art that the utilization of passive circular-polarized viewing-glasses enables the observer to tilt their head without there being a significant reduction in the optical performance of said stereoscopic 3d projection system thereof. It is therefore for this reason the majority of passive stereoscopic 3d projection systems currently on the market are based on circular polarization according to the prior-art.

Furthermore, it will be known to one skilled-in-the-art that said polarization modulator may comprise of at least one or more liquid crystal elements stacked together in order to achieve the required electro-optical switching characteristics. One technology known to the art for fulfilling this requirement and described, for example, in U.S. Pat. No. 7,760,157 B2 issued Jul. 20, 2010 and entitled "Enhanced ZScreen modulator techniques", describes how said polarization modulator may comprise of two individual pi-cell liquid crystal elements stacked together in mutually crossed orientation such that the surface alignment directors in the first pi-cell are orthogonal to the surface alignment directors in the second pi-cell thereof. Pi-cell liquid crystal elements are known to the art and characterized by their surface alignment directors on both substrates being aligned mutually parallel. Therefore, in at least one optical state the liquid crystal materials composing said pi-cell form a helical structure between said substrates with an overall twist of 180 degrees (i.e pi or π radians). A detailed description of the design and function of pi-cell liquid crystal elements can be found elsewhere in the literature according to the prior-art.

Moreover, each pi-cell liquid crystal element can, for example, be rapidly switched between a first optical state possessing an optical retardation value that is substantially equal to zero when driven with high voltage (eg. 25 volt) in order to switch said liquid crystal materials to the homeotropic texture, and a second optical state possessing an optical retardation value that is substantially equal to 140 nm (nanometers) when driven with a low voltage (eg. 3 volt) in order to switch said liquid crystal materials to the splay texture. The homeotropic texture is characterized by the molecular axes of said liquid crystal materials being aligned substantially perpendicular to the surfaces of both substrates, whereas the splay texture is characterized by said molecular axes for said liquid crystal materials being aligned substantially parallel with the surfaces of said substrates and additionally with the twist within said liquid crystal materials being substantially equal to zero. Furthermore, said pi-cell liquid crystal elements are capable of being rapidly switched between said first and second optical states thereof at speeds of greater than typically 250 µs (microseconds) and are therefore often used when designing such polarization modulators according to the state-of-the-art.

It will also be known to one skilled-in-the-art that when one of said pi-cell liquid crystal elements is in said second optical state possessing a retardation value substantially equal to 140 nm, then said pi-cell liquid crystal element constitutes an optical Quarter-Wave-Plate (QWP) for the central part of the visible wavelength spectrum and will therefore convert incident linearly polarized visible light to circular polarization.

Therefore, by stacking together two individual pi-cell liquid crystal elements in mutually crossed orientation together with a linear polarization-filter located at the input surface of said stack of liquid crystal elements in order to first convert the initially randomly polarized (i.e unpolarized) incident light generated by said projector to linear polarization, then the images generated by said projector can be rapidly modulated between left and right circular polarization states by operating said pi-cell liquid crystal elements mutually out-of-phase according to the state-of-the-art. Specifically, when said first pi-cell liquid crystal element is operated with high voltage (i.e liquid crystal materials are switched to said homeotropic texture) then said second pi-cell liquid crystal element is simultaneously operated with low voltage (i.e liquid crystal materials are switched to said splay texture), and vice versa according to the state-of-the-art.

However, it will be understood by one skilled-in-the-art that in order for each of said pi-cell liquid crystal elements to generate circular polarization from visible light that is initially linearly polarized, the product of the anisotropic index of refraction (Δn) and cell-gap (d) for each of said pi-cell liquid crystal elements thereof is mandated to be substantially equal to 0.14 μm (micrometers), corresponding to a QWP for the central part of the visible wavelength spectrum.

This therefore limits the minimum permissible value for the product of the anisotropic index of refraction (Δn) and cell-gap (d) for said liquid crystal elements thereof when utilizing circular polarization according to the state-of-the-art. Moreover, since the switching speed of said liquid crystal elements is directly related to said product of anisotropic index of refraction (Δn) and cell-gap (d), this therefore limits the maximum speed at which said liquid crystal elements are able to switch between said first and second optical states thereof. Specifically, it will be known to one skilled-in-the-art that the switching speed of said liquid crystal elements is directly related to both (i) the reciprocal of the cell-gap (d), and (ii) the viscosity of the liquid crystal materials. Moreover, the viscosity of said liquid crystal materials principally depends upon the value of the dielectric anisotropy (Δε), which in turn is related to the value of the anisotropic index of refraction (Δn).

In practice, the maximum switching speed of pi-cell liquid crystal elements designed to generate circular polarization when operating together with visible light is typically only approximately 250 μs, and this relatively slow speed therefore limits both the maximum frame-rate at which said pi-cell liquid crystal elements are able to operate, as well as limiting the maximum optical light efficiency that can be achieved due to the necessity of utilizing a relatively long dark-time period for the projector. The dark-time period is defined as being the time interval between successive images generated by said projector, and during said dark-time period no light is emitted by said projector.

Furthermore, since the images generated by a typical 3-chip DLP digital cinema projector are initially randomly polarized (i.e unpolarized), then it will be known to one skilled-in-the-art that the linear polarization-filter located at the input surface of said polarization modulator will absorb approximately 50% of the incoming light initially generated by said projector. This will therefore also significantly reduce the overall optical light efficiency of the aforementioned system, thereby resulting in the creation of time-multiplexed stereoscopic 3d images according to the state-of-the-art that are severely lacking in on-screen image brightness.

One technology known to the art for increasing the overall optical light efficiency of a stereoscopic 3d projection system and described, for example, in U.S. Pat. No. 7,857,455 B2 issued Dec. 28, 2010 and entitled "Combining P and S rays for bright stereoscopic projection", and again in U.S. Pat. No. 8,220,934 B2 issued Jul. 17, 2012, and entitled "Polarization conversion systems for stereoscopic projection", uses a polarization beam-splitting element in order to split the incoming randomly polarized incident image-beam generated by a single-lens projector into one primary image-beam propagating substantially in the same direction as said original incident image-beam and possessing a first state of linear polarization (eg. P type linear polarization), and one secondary image-beam propagating substantially in a perpendicular direction relative to said incident image-beam and possessing a second state of linear polarization (eg. S type linear polarization), with said first and second states of linear polarization being mutually orthogonal.

Thereafter, a reflecting surface such as a mirror or otherwise is used to deflect the optical path of said secondary image-beam towards the surface of a polarization-preserving projection-screen, thereby enabling both said primary and secondary image-beams to be arranged so as to mutually overlap to a substantial extent on the surface of said projection-screen thereof. The aforementioned double image-beam system according to the state-of-the-art therefore enables both the S and P linear polarization components composing said initial incident image-beam generated by said projector to be used in order to recreate the overall on-screen image, thereby increasing the resulting image brightness.

Additionally, a polarization rotator is typically required in order to rotate the linear polarization state of said secondary image-beam by substantially 90 degrees and ensure that both said primary and secondary image-beams thereafter possess the same linear state of polarization. Furthermore, one or more polarization modulators are located within the optical paths for each of said primary and secondary image-beams thereof and operated in synchronization with said projector in order to arrange for all left-eye images to possess a first state of circular polarization and all right-eye images to possess a second state of circular polarization, with said first and second states of circular polarization being mutually orthogonal.

However, it will once again be understood by one skilled-in-the-art that in order for said pi-cell liquid crystal elements composing at least one of said polarization modulators to convert said linearly polarized visible incident light to circular polarization, the product of the anisotropic index of refraction (Δn) and cell-gap (d) for each of said liquid crystal elements thereof is mandated to be substantially equal to 0.14 μm, corresponding to a QWP for the central part of the visible spectrum. This therefore once again limits the minimum permissible value for said product of anisotropic index of refraction (Δn) and cell-gap (d) for said liquid crystal elements thereof, thereby also limiting the maximum switching speed that can be achieved by said liquid crystal elements according to the state-of-the-art. This results in there being a limitation on both the maximum frame-rate as well as the maximum optical light efficiency that can be achieved by said stereoscopic 3d projection system that is based on circular polarization according to the prior-art.

The double image-beam system described above according to the state-of-the-art also has the disadvantage in that there is a relatively large optical path-length difference between said primary and secondary image-beams thereof, thereby typically requiring the use of a telephoto-lens pair and/or the deformation of said reflecting-surface in order to compensate for said optical path-length difference. However, this adds both complexity and expense to the overall system.

An improved system for the displaying of high brightness time-multiplexed stereoscopic 3d images according to the state-of-the-art is described, for example, in U.S. Patent Application Publication No. 2015/0103318 A1 dated Apr. 16, 2015 and entitled "Stereoscopic image apparatus", and again in U.S. Pat. No. 9,740,017 B2 issued Aug. 22, 2017 and entitled "Optical polarization device for a stereoscopic image projector". Here, a beam-splitting element is used to separate the randomly polarized incident image-beam generated by a single-lens projector into one primary image-beam propagating substantially in the same direction as said original incident image-beam and possessing a first state of linear polarization (eg. P type linear polarization), and two secondary image-beams propagating in mutually opposite directions that are also both substantially perpendicular to said original incident image-beam thereto and possessing a second state of linear polarization (eg. S type linear polarization), with said first and second linear polarization states being mutually orthogonal.

Thereafter, reflecting surfaces such as mirrors or otherwise are used to deflect the optical paths for each of said secondary image-beams towards a polarization-preserving projection-screen and arranged such that said primary and secondary image-beams partially overlap in order to mutually combine and recreate a complete image on the surface of said projection-screen thereto. The aforementioned triple image-beam system therefore enables both the S and P linear polarization components composing said original incident image-beam generated by said projector to be used in order to recreate the overall on-screen image, thereby ensuring for a higher level of image brightness as compared to a single image-beam system.

Additionally, polarization modulators are located within the optical paths for each of said primary and secondary image-beams thereof and operated so as to modulate the polarization states of said image-beams in synchronization with the images generated by said projector. Moreover, said polarization modulators typically each comprise a stack of two individual pi-cell liquid crystal elements aligned in mutually crossed orientation and arranged so as to convert the linear polarization states of said primary and secondary image-beams to circular polarization. Specifically, it is arranged such that all left-eye images possess a first state of circular polarization, and all right-eye images possess a second state of circular polarization, with said first and second states of circular polarization being mutually orthogonal. A time-multiplexed stereoscopic 3d image can hence be viewed on the surface of said projection-screen via utilization of passive circular-polarized viewing-glasses.

It will be understood by one skilled-in-the-art that the aforementioned triple image-beam system according to the state-of-the-art possesses a relatively small optical path-length difference between said primary and secondary image-beams as compared to the previously described double image-beam system thereto, thereby eliminating the necessity of utilizing a telephoto-lens pair in order to compensate for said optical path-length difference. This therefore reduces the overall complexity and cost of said triple image-beam system according to the prior-art.

However, once again said triple image-beam system according to the state-of-the-art utilizes circular polarization in order to enable the observer to tilt their head without there being a significant reduction in the overall optical performance. It will therefore be understood by one skilled-in-the-art that this criterion mandates the product of the anisotropic index of refraction ($\Delta n$) and cell-gap (d) for each of said liquid crystal elements thereof to be substantially equal to 0.14 µm, thereby limiting the maximum switching speed at which said liquid crystal elements can operate. This in turn limits both the maximum frame-rate and the maximum optical light efficiency that can be achieved by said liquid crystal elements thereof, hence limiting the overall performance of said time-multiplexed stereoscopic 3d projection system according to the state-of-the-art.

BRIEF DESCRIPTION OF THE INVENTION

An object of the present invention is to provide a time-multiplexed stereoscopic 3d projection system based on elliptical polarization that is capable of operating at higher frame-rates as compared to other prior-art technologies that instead use circular polarization according to the state-of-the-art. A further object of the present invention is to provide a stereoscopic 3d projection system that possesses an improved level of optical light efficiency due to the utilization of a reduced dark-time period for the projector as compared to the prior-art.

The invention is based on the insight that when using elliptical polarization that is neither circular nor linear polarization, the product of the anisotropic index of refraction ($\Delta n$) and cell-gap (d) can be reduced for at least one of said liquid crystal elements composing at least one of said polarization modulators used to modulate the polarization state of the projected-image as compared to that for other prior-art technologies that instead use circular polarization according to the state-of-the-art.

This in turn allows either (i) a liquid crystal material to be used that possesses a lower anisotropic index of refraction ($\Delta n$) and therefore also a lower viscosity, and/or (ii) a liquid crystal element to be used that possesses a smaller cell-gap (d). Moreover, both of these criteria enable said liquid crystal elements to switch at faster speeds as compared to liquid crystal elements that are instead designed to generate circular polarization according to the prior-art.

Furthermore, the improvement in switching speed for said liquid crystal elements thereof when utilizing elliptical polarization according to the present invention enables the disclosed stereoscopic 3d projection system to operate at higher frame-rates, and/or with increased optical light efficiency due to there being a reduction in the dark-time period for said projector as compared to other prior-art technologies.

BRIEF DESCRIPTION OF THE FIGURES

The present invention may be better understood and its objects and advantages will become apparent to one skilled-in-the-art by reference to the accompanying drawings, wherein like reference numerals refer to like elements in several of the figures.

DETAILED DESCRIPTION OF THE INVENTION

Figure 1:
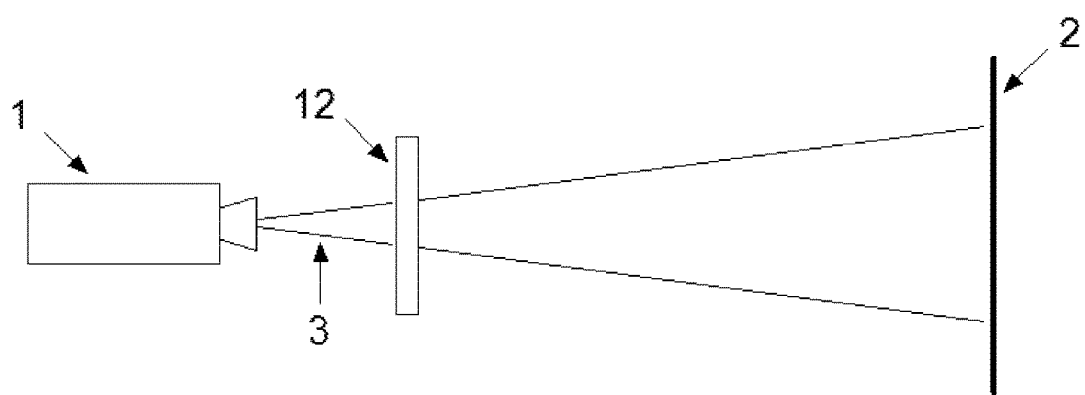
FIG. 1: Stereoscopic 3d projection system using a single image-beam architecture together with passive circular-polarized viewing-glasses (not shown) according to the state-of-the-art.

FIG. 1 shows a stereoscopic 3d projection system based on a single image-beam architecture according to the state-of-the-art where a polarization modulator 12 comprising a stack of one or more liquid crystal elements (not shown) is placed directly in-front of the lens of a projector 1, such as a 3-chip DLP digital cinema projector or otherwise.

The projector 1 generates an incident image-beam 3 comprising a succession of alternate left and right-eye images at high frequency of typically 144 Hz and said polarization modulator 12 is arranged so as to impart a first circular polarization state to all left-eye images and a second circular polarization state to all right-eye images, with said first and second circular polarization states being mutually orthogonal.

Thereafter, said left and right-eye images are focused onto the surface of a polarization-preserving projection-screen 2 such as a silver-screen or otherwise, thereby enabling the viewing of time-multiplexed stereoscopic 3d images on the surface of said projection-screen via utilization of passive circular-polarized viewing-glasses (not shown).

Furthermore, since typical cinema projectors currently on the market such as 3-chip DLP projectors generate images that are initially randomly polarized, it will be known to one skilled-in-the-art that a linear polarization-filter (not shown) is typically required to be located in close proximity to the input surface of said polarization modulator 12. Additionally, said polarization modulator 12 typically comprises a stack of two pi-cell liquid crystal elements (not shown) arranged in mutually crossed orientation. Moreover, said pi-cell liquid crystal elements can, for example, be rapidly switched between a first optical state possessing zero optical retardation when driven with high voltage (eg. 25 volt), and a second optical state possessing an optical retardation substantially equal to 140 nm when driven with low voltage (eg. 3 volt) according to the state-of-the-art.

Furthermore, when the optical retardation present in one of said pi-cell liquid crystal elements is substantially equal to 140 nm, then said pi-cell liquid crystal element constitutes a QWP for the central part of the visible wavelength spectrum and will therefore convert visible incident light that is initially linearly polarized to circular polarization. Moreover, by operating said pi-cell liquid crystal elements mutually out-of-phase, said polarization modulator 12 can be arranged so as to rapidly modulate the polarization state of said incident image-beam 3 between a left and right circular polarization state according to the prior-art.

Additionally, it will be known to one skilled-in-the-art that in order for said pi-cell liquid crystal elements to be able to convert linearly polarized visible light to circular polarization, the product of the anisotropic index of refraction ($\Delta n$) and cell-gap (d) for each of said liquid crystal elements thereof is mandated to be substantially equal to 0.14 µm (i.e 140 nm), corresponding to a QWP for the central part of the visible spectrum. This therefore limits the minimum permissible value for said product of anisotropic index of refraction ($\Delta n$) and cell-gap (d) for said liquid crystal elements thereof, thereby also limiting the maximum switching speed that said liquid crystal elements can achieve when designed to generate circular polarization according to the state-of-the-art.

In practice, the maximum switching speed that can be achieved by said pi-cell liquid crystal elements designed to generate circular polarization is typically only 250 µs, hence limiting the maximum frame-rate at which said stereoscopic 3d projection system can operate and also reducing the overall optical light efficiency due to it being necessary to use a relatively long dark-time period for said projector.

In order to view a stereoscopic 3d image when using the aforementioned single image-beam stereoscopic 3d projection system shown in FIG. 1, it is necessary to utilize passive circular-polarized viewing-glasses (not shown). Furthermore, it will be known to one skilled-in-the-art that the use of circular polarization enables the viewer to tilt their head without there being a significant loss in optical performance. This is contrary to the situation where linear polarization is instead used and in this case there would then be a significant loss in optical performance whenever the viewer tilted their head. It will also be known to one skilled-in-the-art that said linear polarization-filter located in close proximity to the input surface of said polarization modulator 12 will absorb approximately 50% of the light composing said incident image-beam 3 generated by said projector 1, hence significantly reducing the overall on-screen image brightness.

Figure 2:
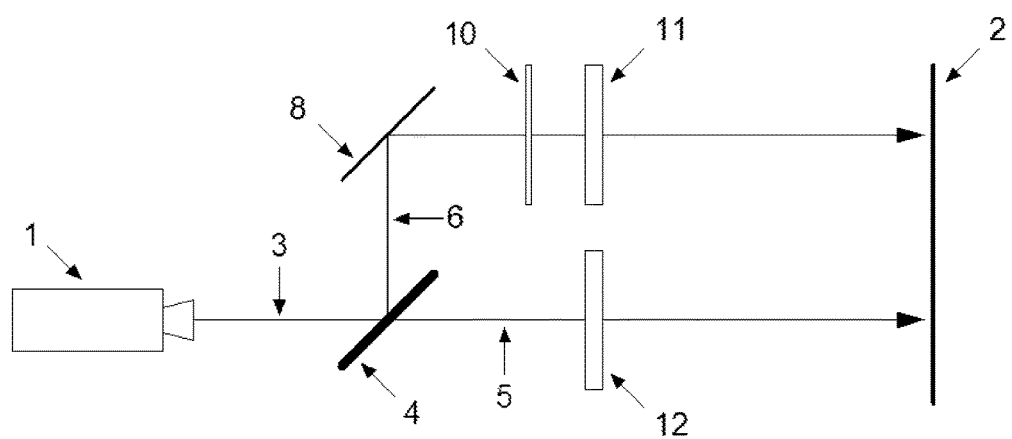
FIG. 2: Stereoscopic 3d projection system using a double image-beam architecture together with passive circular-polarized viewing-glasses (not shown) according to the state-of-the-art.

FIG. 2 shows an alternative time-multiplexed stereoscopic 3d projection system comprising a double image-beam architecture according to the state-of-the-art. In this figure and all underlying figures thereafter, the optical paths for the individual image-beams are represented by single-line vectors for ease of clarity. However, it will be understood by one skilled-in-the-art that said image-beams typically possess some level of angular beam divergence, for example ±10 degrees in the vertical plane and ±25 degrees in the horizontal plane, respectively. However, it is to be understood that the occurrence of said angular beam divergence does not result in there being a departure from the inventive ideas disclosed herein and said angular beam divergence will therefore be omitted in the underlying drawings for ease of clarity.

Here, a projector 1 emits an incident image-beam 3 comprising a succession of alternate left and right-eye images at high frequency of typically 144 Hz. The image-beam 3 then impinges on a polarization beam-splitting element 4 and said beam-splitting element generates one primary image-beam 5 propagating substantially in the same direction as said incident image-beam 3 and possessing a first state of linear polarization (eg. P type linear polarization), and one secondary image-beam 6 propagating substantially in a perpendicular direction relative to said original incident image-beam 3 and possessing a second state of linear polarization (eg. S type linear polarization, with said first and second states of linear polarization being mutually orthogonal.

There is also provided a reflecting surface 8, such as a silver-mirror or otherwise, which is arranged to deflect the optical path of said secondary image-beam 6 towards a polarization-preserving projection-screen 2, such as a silver-screen or otherwise. The images generated on the surface of said projection-screen 2 by said primary and secondary image-beams 5, 6 thereof are then arranged so as to mutually overlap by a substantial amount in order to recreate a complete image on the surface of said projection-screen thereto. This therefore enables both the S and P linear polarization components composing said original incident image-beam 3 to be used in order to generate the overall on-screen image, thereby ensuring for a higher level of image brightness as compared to the aforementioned single image-beam system according to the state-of-the-art.

Additionally, a polarization rotator 10 is typically located within the optical path of said secondary image-beam 6 thereof and arranged so as to convert the linear polarization state of said secondary image-beam 6 to that of said primary image-beam 5, thereby ensuring that both said primary and secondary image-beams 5, 6 thereafter possess the same state of linear polarization. Furthermore, one or more polarization modulators 11, 12 are then used to rapidly modulate the state of polarization for each of said primary and secondary image-beams 5, 6 thereof between a left and right circular polarization state in synchronization with the images generated by said projector 1. Specifically, it is arranged such that all left-eye images generated on the surface of said projection-screen 2 possess a first state of circular polarization, and all right-eye images generated on the surface of said projection-screen 2 possess a second state of circular polarization, with said first and second states of circular polarization being mutually orthogonal. This therefore enables a time-multiplexed stereoscopic 3d image to be viewed on the surface of said projection-screen 2 via utilization of passive circular-polarized viewing-glasses (not shown) according to the prior-art.

Moreover, it will be known to one skilled-in-the-art that said polarization modulators 11, 12 typically each comprise a stack of two pi-cell liquid crystal elements (not shown) aligned in mutually crossed orientation and with each of said pi-cell liquid crystal elements designed so as to be able to convert incident linearly polarized visible light directly to circular polarization. Additionally, by operating each of said pi-cell liquid crystal elements mutually out-of-phase, then it will be known to one skilled-in-the-art that said polarization modulators 11, 12 are capable of rapidly modulating the polarization state of each of said primary and secondary image-beams 5, 6 thereof between a left and right circular polarization state according to the prior-art.

It will also be known to one skilled-in-the-art that in order for said pi-cell liquid crystal elements to be able to convert linearly polarized visible light to circular polarization, the product of the anisotropic index of refraction ($\Delta n$) and cell-gap (d) for each of said liquid crystal elements thereof is mandated to be substantially equal to 0.14 µm, corresponding to a QWP for the central part of the visible spectrum. This therefore limits the minimum permissible value for said product of anisotropic index of refraction ($\Delta n$) and cell-gap (d) for said liquid crystal elements thereof, thereby once again limiting both the maximum frame-rate as well as the maximum optical light efficiency that can be achieved when using said liquid crystal elements designed to generate circular polarization according to the state-of-the-art.

Figure 3:
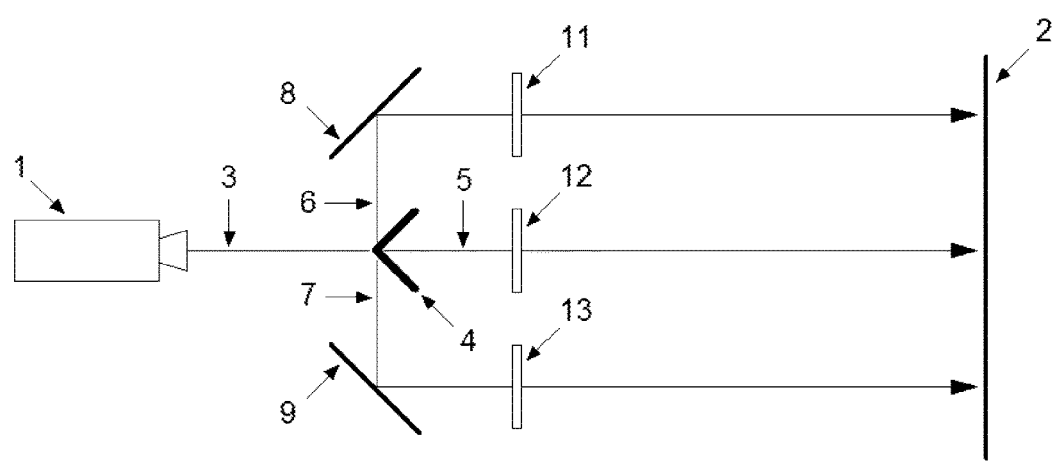
FIG. 3: Stereoscopic 3d projection system using a triple image-beam architecture together with passive circular-polarized viewing-glasses (not shown) according to the state-of-the-art.

FIG. 3 shows another time-multiplexed stereoscopic 3d projection system based on a triple image-beam architecture according to the state-of-the-art. Here, a beam-splitting element 4 is used to separate the randomly polarized incident image-beam 3 generated by a single-lens projector 1 into one primary image-beam 5 propagating substantially in the same direction as said original incident image-beam 3 and possessing a first state of linear polarization (eg. P type linear polarization), and two secondary image-beams 6, 7 propagating in mutually opposite directions that are both substantially perpendicular to said original incident image-beam 3 and possessing a second state of linear polarization (eg. S type linear polarization), with said first and second linear polarization states being mutually orthogonal.

Thereafter, reflecting surfaces 8, 9 such as silver-mirrors or otherwise are used to deflect the optical paths for each of said secondary image-beams 6, 7 thereof towards a polarization-preserving projection-screen 2 and arranged such that said primary and secondary image-beams 5, 6, 7 partially overlap in order to mutually combine and recreate a complete image on the surface of said projection-screen thereto. Such triple image-beam systems therefore enable both the S and P linear polarization components composing said original incident image-beam 3 to be used in order to generate the overall on-screen image, thereby ensuring for a higher level of image brightness as compared to the aforementioned single image-beam system according to the state-of-the-art.

Furthermore, polarization modulators 11, 12, 13 are located within the optical paths for each of said primary and secondary image-beams 5, 6, 7 thereof and operated so as to modulate the polarization states of said image-beams in synchronization with the images generated by said projector 1. Moreover, said polarization modulators 11, 12, 13 typically each comprise a stack of two individual pi-cell liquid crystal elements (not shown) aligned in mutually crossed orientation and operated so as to rapidly modulate the linear polarization states of said primary and secondary image-beams 5, 6, 7 thereof between a left and right circular polarization state in synchronization with the images generated by said projector 1.

Specifically, it is arranged such that all left-eye images generated on the surface of said projection-screen 2 possess a first state of circular polarization, and all right-eye images generated on the surface of said projection-screen 2 possess a second state of circular polarization, with said first and second states of circular polarization being mutually orthogonal. This therefore enables a time-multiplexed stereoscopic 3d image to be viewed on the surface of said projection-screen 2 via utilization of passive circular-polarized viewing-glasses (not shown) according to the state-of-the-art.

It will also be known to one skilled-in-the-art that in order for said pi-cell liquid crystal elements to be able to convert linearly polarized visible light to circular polarization, then the product of the anisotropic index of refraction ($\Delta n$) and cell-gap (d) for each of said liquid crystal elements thereof is mandated to be substantially equal to 0.14 µm, corresponding to a QWP for the central part of the visible spectrum. This therefore limits the minimum permissible value for said product of anisotropic index of refraction ($\Delta n$) and cell-gap (d) for said liquid crystal elements thereof, thereby once again limiting both the maximum frame-rate as well as the maximum optical light efficiency that can be achieved when using said liquid crystal elements designed to generate circular polarization according to the state-of-the-art.

Figure 4:
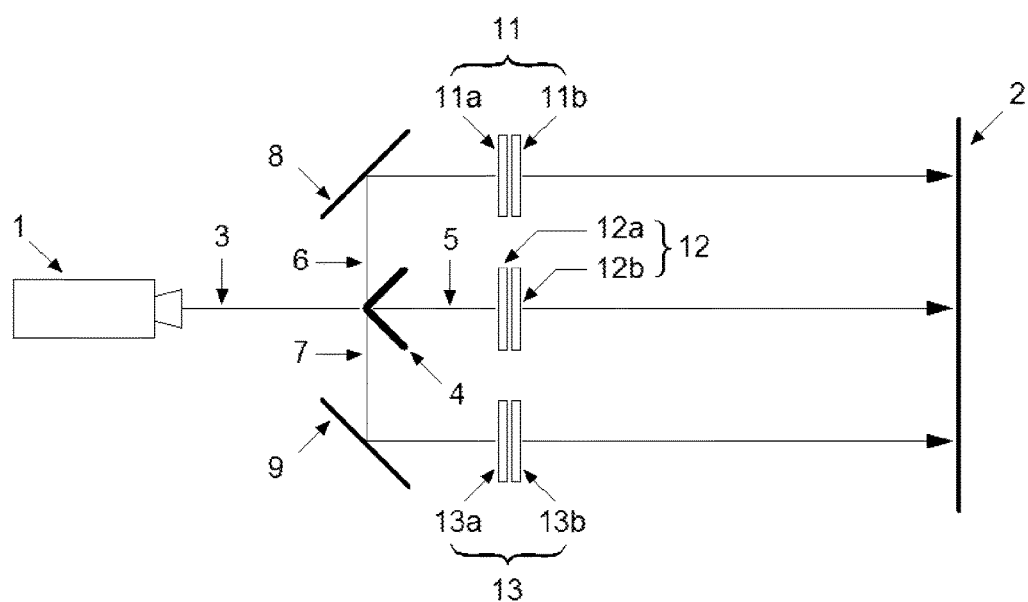
FIG. 4: Stereoscopic 3d projection system using a triple image-beam architecture together with passive elliptically-polarized viewing-glasses (not shown) according to a preferred embodiment of the present invention.

FIG. 4 shows a preferred embodiment of the present invention. Here, a single-lens projector 1 is arranged so as to generate a randomly polarized incident image-beam 3 comprising a rapid succession of alternate left and right-eye images at high speeds of typically 144 Hz. Thereafter, a beam-splitting element 4 is used to separate said incident image-beam 3 generated by said projector 1 into one primary image-beam 5 propagating substantially in the same direction as said original incident image-beam 3 and possessing a first state of polarization such as but not limited to linear polarization (eg. P type linear polarization), and two secondary image-beams 6, 7 propagating in mutually opposite directions that are also both substantially perpendicular to said original incident image-beam 3 and possessing a second state of polarization such as but not limited to linear polarization (eg. S type linear polarization), with said first and second polarization states being mutually orthogonal.

Thereafter, reflecting surfaces 8, 9 such as but not limited to silver-mirrors or otherwise, are provided in order to deflect the optical paths for each of said secondary image-beams 6, 7 thereof towards the surface of a polarization-preserving projection-screen 2, such as a silver-screen or otherwise, and arranged such that said primary and secondary image-beams 5, 6, 7 at least partially overlap in order to mutually combine and recreate a complete image on the surface to of said projection-screen 2.

Additionally, there is provided polarization modulators 11, 12, 13 located within the optical paths for each of said primary and secondary image-beams 5, 6, 7 thereof. Furthermore, said polarization modulators 11, 12, 13 are operated in synchronization with the images generated by said projector 1 and arranged such that all left-eye images possess a first state of elliptical polarization and all right-eye images possess a second state of elliptical polarization, wherein said first and second elliptical polarization states are neither circular nor linear polarization states and with said first and second states of elliptical polarization being mutually orthogonal (i.e said first and second elliptical polarization states have opposite senses of rotation, and additionally the major-axis for said first elliptical polarization state is perpendicular to the major-axis for said second elliptical polarization state thereof). A time-multiplexed stereoscopic 3d image can hence be observed on the surface of said projection-screen 2 via utilization of suitable passive elliptically-polarized viewing-glasses (not shown) according to the present invention.

Furthermore, a preferred embodiment of the present invention is that each of said polarization modulators 11, 12, 13 comprise a stack of at least two individual pi-cell liquid crystal elements placed together and aligned in mutually crossed orientation such that the surface alignment directors in the first pi-cell liquid crystal element are substantially orthogonal to the surface alignment directors in the second pi-cell liquid crystal element thereof. Specifically, it is disclosed that the first polarization modulator 11 comprises a stack of two pi-cell liquid crystal elements 11a, 11b, the second polarization modulator 12 comprises a stack of two pi-cell liquid crystal elements 12a, 12b, and the third polarization modulator 13 comprises a stack of two pi-cell liquid crystal elements 13a, 13b, respectively. Moreover, each of said pi-cell liquid crystal elements 11a, 11b, 12a, 12b, 13a and 13b are further designed so as to be able to convert incident linearly polarized visible light directly to elliptical polarization when said pi-cell liquid crystal elements are switched to said splay texture according to a further embodiment of the present invention.

Moreover, it will be understood by one skilled-in-the-art that in order for said pi-cell liquid crystal elements to be able to convert incident linearly polarized visible light to elliptical polarization, the product of the anisotropic index of refraction (Δn) and cell-gap (d) for each of said pi-cell liquid crystal elements 11a, 11b, 12a, 12b, 13a and 13b thereof can be arranged so as to be substantially less than 0.14 μm, and more preferably having a value in the interval between 0.08 μm and 0.14 μm, and even more preferably having a value substantially equal to 0.11 μm according to various preferred embodiments of the present invention.

In such case, it will be understood by one skilled-in-the-art that due to the reduction in the product of the anisotropic index of refraction (Δn) and cell-gap (d), then said pi-cell liquid crystal elements that are designed to generate elliptical polarization according to the present invention will be able to switch at faster speeds as compared to pi-cell liquid crystal elements that are instead designed to generate circular polarization according to the prior-art. This therefore enables said stereoscopic 3d projection system that is based on elliptical polarization according to the present invention to operate at higher frame-rates and with a higher optical light efficiency as compared to other prior-art technologies that are instead based on circular polarization.

For example, it will be understood by one skilled-in-the-art that in order to design a pi-cell liquid crystal element that is capable of converting incident linearly polarized visible light to circular polarization according to the state-of-the-art, the product of the anisotropic index of refraction (Δn) and cell-gap (d) is mandated to be substantially equal to 0.14 μm, corresponding to a QWP for the central part of the visible spectrum. This criterion can be fulfilled, for example, by using a liquid crystal element possessing a cell-gap (d) equal to 2.3 μm and being filled with the HAE635023 liquid crystal material supplied by Jiangsu Hecheng Display Technology Co, Ltd (HCCH) which possesses an anisotropic index of refraction (Δn) equal to 0.060 (dimensionless unit). However, if instead said pi-cell liquid crystal element is designed to convert incident linearly polarized visible light to elliptical polarization according to a preferred embodiment of the present invention where the product of the anisotropic index of refraction (Δn) and cell-gap (d) is arranged to be substantially equal to 0.11 μm, then in this case the cell-gap (d) will be mandated to be only 1.8 μm when using the same aforementioned liquid crystal material.

Furthermore, since the switching speed of said liquid crystal elements is a reciprocal function of the cell-gap (d), then it will be understood by one skilled-in-the-art that the use of pi-cell liquid crystal elements designed to generate elliptical polarization will provide for a stereoscopic 3d system that is capable of operating at higher frame-rates and/or with higher optical light efficiency as compared to other prior-art technologies that instead use pi-cell liquid crystal elements that are designed to generate circular polarization.

Moreover, it will be understood by one skilled-in-the-art that passive elliptically-polarized viewing-glasses typically comprise a first lens for the left-eye and a second lens for the right-eye, with said first and second lenses each further comprising a linear polarization-filter laminated together with an optical retardation-film, such as but not limited to an in-plane uniaxially stretched optical-film or otherwise. Furthermore, in order to minimize the overall level of perceived ghosting or crosstalk when utilizing said stereoscopic 3d projection system according to the present invention, then it will be understood by one skilled-in-the-art that the magnitude of optical retardation present in said optical-film composing each of said first and second lenses thereof is mandated to be substantially equal to the magnitude of retardation present in each of said liquid crystal elements 11a, 11b, 12a, 12b, 13a and 13b composing said polarization modulators 11, 12, 13 thereof when said liquid crystal elements are switched to said splay texture. Furthermore, the optical axis of said retardation present in at least one of said optical-films is also mandated to be mutually perpendicular to the optical axis of said retardation present in at least one of said liquid crystal elements thereof. These criteria can be summarized by the following two equations:

$$P1-R1=0$$

$$P2-R2=0$$

where P1, P2, R1 and R2 are defined as follows:
Retardation in first pi-cell liquid crystal element when switched to splay texture=P1
Retardation in second pi-cell liquid crystal element when switched to splay texture=P2
Retardation in optical-film composing first lens for left-eye=R1
Retardation in optical-film composing second lens for right-eye=R2

For example, if the product of the anisotropic index of refraction (Δn) and cell-gap (d) for each of said pi-cell liquid crystal elements 11a, 11b, 12a, 12b, 13a and 13b thereof is arranged to be substantially equal to 0.11 μm according to one of the preferred embodiments of the present invention, then the optical-film composing each of said first and second lenses further composing said passive elliptically-polarized viewing-glasses is also mandated to possess a retardation value substantially equal to 0.11 μm (i.e 110 nm) in order to minimize the overall level of perceived ghosting or crosstalk. Furthermore, the optical axis of said retardation present in at least one of said liquid crystal elements is also mandated to be aligned orthogonal to the optical axis of said retardation present in at least one of said optical-films thereof. The fulfillment of these two criteria therefore ensures that said stereoscopic 3d projection system based on elliptical polarization according to the present invention generates a low level of perceived ghosting or crosstalk.

Furthermore, a preferred embodiment of the present invention is that the product of the anisotropic index of refraction (Δn) and cell-gap (d) for each of said liquid crystal elements 11a, 11b, 12a, 12b, 13a and 13b thereof is arranged to be substantially less than 0.14 μm, and more preferably in the interval between 0.08 μm and 0.14 μm, and even more preferably being substantially equal to 0.11 μm according to various embodiments of the present invention. Therefore, in order to minimize the level of ghosting or crosstalk, it will be understood by one skilled-in-the-art that the quantity of in-plane retardation present in at least one of said optical-films composing at least one of said lenses further composing said elliptically-polarized viewing-glasses is also mandated to be substantially less than 140 nm, and more preferably in the interval between 80 nm and 140 nm, and even more preferably being substantially equal to 110 nm according to various further embodiments of the present invention.

Moreover, it will also be understood by one skilled-in-the-art that in order to maximize the static optical transmission and minimize the optical chromaticity for each of said lenses composing said passive elliptically-polarized viewing-glasses, then the summation of the retardation generated by each of said pi-cell liquid crystal elements when switched to said splay texture and the retardation present in said optical-films composing at least one of said lenses further composing said elliptically-polarized viewing-glasses should preferably be substantially equal to approximately 275 nm, corresponding to a Half-Wave-Plate (HWP) for the central part of the visible spectrum. This preferred requirement may be summarized by the following additional two equations:

$$P1+R2=275 \text{ nm}$$

$$P2+R1=275 \text{ nm}$$

However, in one preferred embodiment of the present invention, the product of the anisotropic index of refraction (Δn) and cell-gap (d) for each of said pi-cell liquid crystal elements 11a, 11b, 12a, 12b, 13a and 13b thereof is arranged to be substantially equal to 0.11 μm. This therefore mandates the optical-film composing each of said lenses further composing said elliptically-polarized viewing-glasses to also possess a retardation value that is substantially equal to 0.11 μm (i.e 110 nm) in order to minimize the overall level of perceived ghosting or crosstalk.

However, in this case the summation of the optical retardation present in at least one of said pi-cell liquid crystal elements when switched to said splay texture and the optical retardation present in at least one of said optical-films composing at least one of said lenses further composing said elliptically-polarized viewing-glasses will then only be 0.11 μm+0.11 μm=0.22 μm (i.e 220 nm) which does not completely fulfill the preferred requirement where said summation is substantially equal to 275 nm corresponding to a HWP for the central part of the visible spectrum.

However, although the preferred requirement is not completely fulfilled, it will be understood by one skilled-in-the-art that the static optical transmission and chromaticity for each of said lenses composing said elliptically-polarized viewing-glasses will nevertheless still remain at an acceptable level that is suitable for a commercial product when utilizing the aforementioned preferred embodiment of the present invention.

Moreover, it will be understood by one skilled-in-the-art that the use of circular polarization according to the prior-art enables the viewer to tilt their head whilst viewing stereoscopic 3d images without there being a significant loss of optical performance. However, when utilizing elliptically-polarized viewing-glasses according to the present invention, there will be a small reduction in optical performance should the viewer tilt their head away from the vertical position. However, when the product of the anisotropic index of refraction (Δn) and cell-gap (d) for each of said liquid crystal elements 11a, 11b, 12a, 12b, 13a and 13b thereof is within the preferred range as disclosed herein, then the reduction in optical performance will be relatively small, thereby enabling said stereoscopic 3d projection system according to the present invention to operate at higher frame-rates and/or with higher optical light efficiency whilst still maintaining the static optical transmission, chromaticity and head-tilting characteristics at an acceptable level suitable for a commercial product.

Whilst preferred embodiments of the present invention have been shown and described herein, various modifications may be made thereto without departing from the inventive ideas of the present invention. Specifically, the invention has been illustrated together using a triple image-beam architecture, but it will be understood that elliptical polarization that is neither circular nor linear polarization can also be used together with stereoscopic 3d projection systems based on either a single image-beam system or alternatively a double image-beam system without departing from the inventive ideas disclosed herein. Accordingly, it is to be understood that the present invention has been described by way of illustration and not limitation.

I claim:

1. A stereoscopic 3d projection system, comprising:
a projector configured to generate at least one incident image-beam comprising a succession of alternate left and right-eye images; and
at least one polarization modulator placed within the optical path of said incident image-beam; said at least one polarization modulator being configured to impart a first optical polarization state to the left-eye images and a second optical polarization state to the right-eye images, and being configured to focus said left and right-eye images onto a surface of a polarization-preserving projection-screen;
wherein said first and second optical polarization states are elliptical polarization states which are neither circular nor linear polarization states and where said first and second polarization states are substantially mutually orthogonal, thereby enabling the viewing of time-multiplexed, stereoscopic 3d images via utilization of passive elliptically-polarized viewing-glasses; and
wherein the at least one polarization modulator comprises a stack of at least two separate pi-cell liquid crystal elements arranged such that the product of the anisotropic index of refraction (Δn) and cell-gap (d) for at least one of said pi-cell liquid crystal elements is substantially equal in magnitude to the in-plane optical retardation present in at least one of the lenses composing said passive elliptically-polarized viewing-glasses.

2. The stereoscopic 3d projection system according to claim 1, wherein the product of the anisotropic index of refraction (Δn) and cell-gap (d) for at least one of said pi-cell liquid crystal elements is substantially less than 0.14 micrometers.

3. The stereoscopic 3d projection system according to claim 2 wherein said product of the anisotropic index of refraction (Δn) and cell-gap (d) for at least one of said pi-cell liquid crystal elements is in an interval between 0.08 micrometers and 0.14 micrometers.

4. The stereoscopic 3d projection system according to claim 2 wherein said product of the anisotropic index of refraction (Δn) and cell-gap (d) for at least one of said pi-cell liquid crystal elements is substantially equal to 0.11 micrometers.

5. The stereoscopic 3d projection system according to claim 2 wherein the optical axis for said in-plane optical retardation present in at least one lens composing said passive elliptically-polarized viewing-glasses is aligned substantially orthogonal to the optical axis for the retardation present in at least one of said pi-cell liquid crystal elements when said pi-cell liquid crystal element is switched to a splay texture.

6. The stereoscopic 3d projection system according to claim 2 wherein the magnitude of the in-plane optical retardation present in at least one lens composing said passive elliptically-polarized viewing-glasses is substantially less than 140 nanometers.

7. The stereoscopic 3d projection system according to claim 2 wherein the magnitude of the in-plane optical retardation present in at least one lens composing said passive elliptically-polarized viewing-glasses is in an interval between 80 nanometers and 140 nanometers.

8. The stereoscopic 3d projection system according to claim 2 wherein the magnitude of the in-plane optical retardation present in at least one lens composing said passive elliptically-polarized viewing-glasses is substantially equal to 110 nanometers.

9. The stereoscopic 3d projection system according to claim 1 further including:
a beam-splitting element configured to split said incident image-beam into a primary image-beam propagating in substantially the same direction as said incident image-beam and possessing a first state of polarization, and at least one secondary image-beam propagating in a substantially orthogonal direction to said incident image-beam and possessing a second state of polarization, wherein said first and second states of polarization are substantially mutually orthogonal;
a first reflecting surface configured to deflect an optical path of a first secondary image-beam towards the surface of the polarization-preserving projection-screen, such that the images generated by said primary and said first secondary image-beams at least partially overlap on the surface of said projection-screen; and
a first polarization modulator placed within an optical path for said primary image-beam to modulate the primary image-beam between a first and a second elliptical polarization state, and a second polarization modulator placed within the optical path for said first secondary image-beam to modulate the first secondary image-beam between a first and second elliptical polarization state, in order to enable the viewing of time-multiplexed, stereoscopic 3d images via utilization of the passive elliptically-polarized viewing-glasses.

10. The stereoscopic 3d projection system according to claim 9 wherein said beam-splitting element is further configured to split said incident image-beam into the primary image-beam, the first secondary image beam, and a second secondary image-beam, the first and second secondary image beams propagating in mutually opposite directions which are both substantially orthogonal to said incident image-beam and each possessing a second state of polarization, with said first and second states of polarization being mutually orthogonal; wherein there is included a second reflecting surface arranged to deflect an optical path for said second secondary image-beam towards the surface of the polarization-preserving projection-screen such that the images generated by said primary and secondary image-beams on the surface of said projection-screen at least partially overlap; and wherein there is further included a third polarization modulator placed within the optical path for the second secondary image-beam to modulate the second secondary image-beam between a first and second elliptical polarization state, thereby enabling the viewing of time-multiplexed, stereoscopic 3d images via utilization of passive elliptically-polarized viewing-glasses.

11. The stereoscopic 3d projection system according to claim 10 wherein each of said first, second, and third polarization modulators comprises a stack of at least two separate pi-cell liquid crystal elements arranged such that a product of the anisotropic index of refraction (Δn) and cell-gap (d) for at least one of said pi-cell liquid crystal elements is substantially less than 0.14 micrometers.

12. The stereoscopic 3d projection system according to claim 11 wherein an in-plane optical retardation present in at least one lens composing said passive elliptically-polarized viewing-glasses being substantially equal to the product of the anisotropic index of refraction (Δn) and cell-gap (d) for at least one of said pi-cell liquid crystal elements thereof.

13. The stereoscopic 3d projection system according to claim 12 wherein the in-plane optical axis of said retardation present in at least one of the lenses composing said passive elliptically-polarized viewing-glasses being aligned substantially orthogonal to the optical axis of the retardation present in at least one of said pi-cell liquid crystal elements when said pi-cell liquid crystal element is switched to a splay texture.

14. The stereoscopic 3d projection system according to claim 12 wherein the in-plane optical retardation present in at least one of the lenses composing said passive elliptically-polarized viewing-glasses being substantially less than 140 nanometers.

* * * * *